US005774329A

United States Patent [19]

Kuo

[11] Patent Number: 5,774,329

[45] Date of Patent: Jun. 30, 1998

[54] COMPUTER WITH DETACHABLE KEYBOARD UNIT

[75] Inventor: Ping-Huang Kuo, Taipei City, Taiwan

[73] Assignee: Compaq Computer Corporation, Houston, Tex.

[21] Appl. No.: 766,522

[22] Filed: Dec. 13, 1996

[51] Int. Cl.[6] ................................ G06F 1/16; H05K 7/02

[52] U.S. Cl. .......................... 361/680; 174/135; 174/168

[58] Field of Search .................................... 361/680–683; 174/135, 136, 168, 169; 439/67, 77, 329, 345, 367, 371, 450, 451, 452, 470; 364/708.1; G06F 1/16

[56] References Cited

U.S. PATENT DOCUMENTS

| | | | |
|---|---|---|---|
| 4,640,981 | 2/1987 | Kalbfeld | 174/135 |
| 4,650,925 | 3/1987 | Coldren | 174/135 |
| 5,160,812 | 11/1992 | Takahashi et al. | 174/135 |
| 5,175,398 | 12/1992 | Hofmann | 174/169 |
| 5,283,862 | 2/1994 | Lund | 361/680 |
| 5,394,297 | 2/1995 | Toedter | 361/683 |
| 5,544,005 | 8/1996 | Horikoshi et al. | 361/680 |
| 5,646,817 | 7/1997 | Manser et al. | 361/680 |

*Primary Examiner*—Lynn D. Feild

*Attorney, Agent, or Firm*—Konneker & Smith, P.C.

[57] ABSTRACT

A computer includes a housing and a keyboard unit, the housing having a main circuit board with a socket connector provided thereon. The keyboard unit is detachably mounted on the housing and is provided with a ribbon cable extending into the housing and having a terminating end that is removably insertable into the socket connector. The ribbon cable is provided with a transverse restraining strip that is secured to the ribbon cable longitudinally inwardly of its terminating end and has a pair of outwardly projecting end portions. The housing is formed with engaging grooves for removably receiving these outwardly projecting end portions of the restraining strip. Engagement between the restraining strip end portions and the engaging grooves can prevent sudden removal of the terminating end of the ribbon cable from the socket connector, and thus potential damage to the terminating end when the keyboard unit is detached and pulled away from the housing, by isolating the terminating end of the ribbon cable from an initial pulling force exerted on the ribbon cable by movement of the detached keyboard unit from the housing.

23 Claims, 3 Drawing Sheets

3
5
510
4
51
61
71
42
41

510
5
610
610
52
6
52
61
51

3
510
4
5
51
61
71
42
41

COMPUTER WITH DETACHABLE KEYBOARD UNIT

BACKGROUND OF THE INVENTION

1. Field of the Invention

The present invention relates generally to electronic apparatus and, in a preferred embodiment thereof, more particularly relates to a portable computer with a detachable keyboard unit.

2. Description of Related Art

In a conventional portable computer, the keyboard unit is usually formed as a single module that is detachably mounted on the computer housing. As shown in FIG. 1 (Prior Art), the keyboard unit 10 is provided with a ribbon cable 11 which is formed from a flexible printed circuit board and which has a terminating end 110 that is to be inserted into a socket connector 21 in the computer housing 20 for electrical connection with the main board 22 of the computer 1. When the keyboard unit 10 is detached from the computer housing 20 for servicing or repair of the computer 1, a pulling force is applied to the ribbon cable 11 which results in the removal of the terminating end 110 of the ribbon cable 11 from the socket connector 21. Sudden removal of the terminating end 110 from the socket connector 21 can result in wearing or scraping of the printed circuit on the terminating end 110 of the ribbon cable 11, thereby adversely affecting the service life of the keyboard unit 10.

SUMMARY OF THE INVENTION

In carrying out principles of the present invention, in accordance with a preferred embodiment thereof, electronic apparatus is provided which, from a broad perspective, includes electrical circuitry; a component having a flexible connector with an outer portion removably connectable to the electrical circuitry; and protective structure operative to prevent a force exerted on the component, and moving it relative to the electrical circuitry, from being transmitted to the outer portion of the flexible connector and suddenly disconnecting it from the electrical circuitry in a manner potentially damaging the outer portion of the flexible connector.

The electronic apparatus, in an illustrated preferred embodiment thereof, is a computer having a housing portion in which a circuit board is disposed, the component is a keyboard detachably connectable to the housing, and the flexible connector is a ribbon cable having an inner end connected to the keyboard, and an outer end portion removably connectable to a socket structure on the circuit board. The protective structure includes cooperatively engageable structures on the ribbon cable and the computer housing which are operative to prevent a detachment force exerted on the keyboard from being transmitted to the outer end portion of the ribbon cable and suddenly removing it from the circuit board socket structure and potentially damaging the ribbon cable outer end portion.

Representatively, these cooperatively engageable structures comprise a restraining strip, preferably of a semi-rigid material, which is transversely secured to a longitudinally intermediate portion of the ribbon cable and has opposite end portions projecting outwardly beyond the longitudinally extending opposite edges of the ribbon cable, and a pair of housing grooves into which the opposite restraining strip end portions may be removably inserted.

When the keyboard is detached from the computer housing and initially pulled away therefrom, this initial pulling force is transmitted through the ribbon cable to the restraining strip which, due to its securement to the housing, serves as a stop device to prevent the keyboard detachment pulling force from being transmitted to the socket-received outer end portion of the ribbon cable. After the keyboard has been detached from the housing, the ribbon cable end portion may then be carefully removed from the circuit board socket to substantially lessen the possibility of damaging the outer ribbon cable end portion, thereby lengthening the useful service life of the detachable computer keyboard.

DETAILED DESCRIPTION

Figure 1:
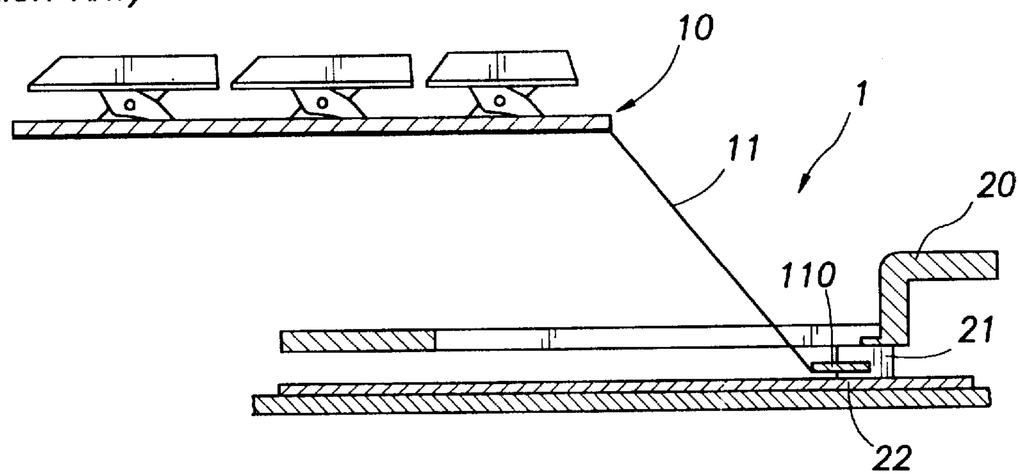
FIG. 1 (Prior Art) is a schematic sectional view which illustrates how a keyboard unit is detached from a conventional portable computer.
Figure 2:
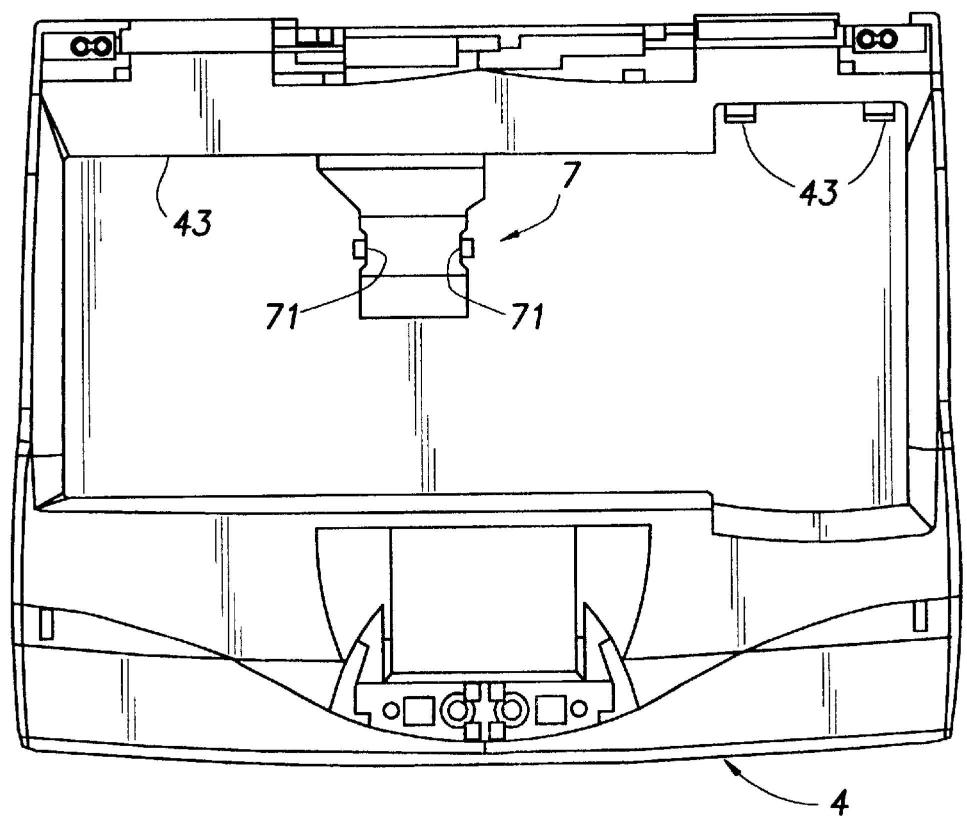
FIG. 2 is a top plan view of a computer housing of a preferred embodiment of the present invention.
Figure 3:
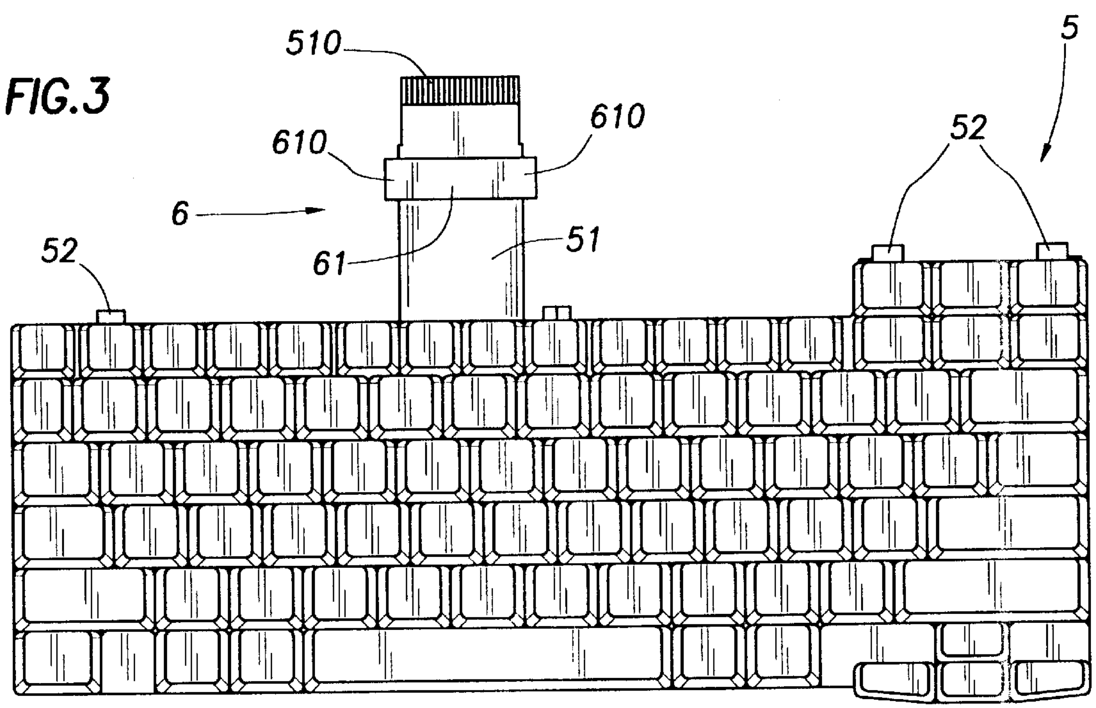
FIG. 3 is a top plan view of a keyboard unit of a preferred embodiment of the present invention.
Figure 4:
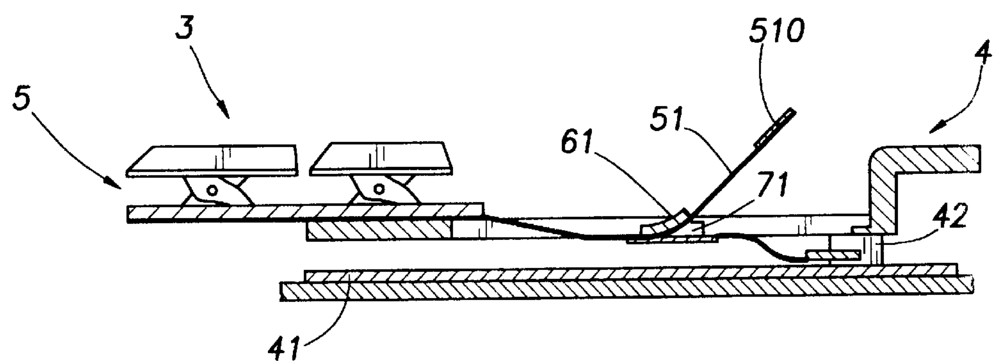
FIG. 4 is a schematic sectional view of a preferred embodiment which illustrates how the keyboard unit is connected electrically to a main board.

Referring to FIGS. 2, 3 and 4, the present invention provides an electronic device, representatively a portable computer 3, which includes a support structure in the form of a housing 4, and a keyboard unit 5. The housing 4 has a main board 41 provided therein. The keyboard unit 5 is detachably and supportingly mounted on an upper housing part of the housing 4 in a conventional manner, and is provided with a flexible connector member in the form of a ribbon cable 51. The ribbon cable 51, which is formed from a flexible printed circuit board, extends into the housing 4 and has a terminating end portion 510 that is removably insertable into a socket connector 42 mounted on the main board 41, thereby permitting electrical connection between the keyboard unit 5 and the main board 41.

According to a key feature of the present invention, the computer 3 has a restraining unit 6 provided on the ribbon cable 51 longitudinally inwardly of its terminating end portion 510, and a retaining unit 7 provided on the housing 4 for removably engaging the restraining unit 6. As subsequently described herein in greater detail, the units 6 and 7 on the ribbon cable and housing function as cooperative, releasably interengageable structures to prevent damage to the ribbon cable terminating end portion 510 arising from its abrupt forcible removal from the socket connector 42 in conjunction with a removal of the keyboard 5 from the housing 4.

The restraining unit 6 is representatively a semi-rigid restraining strip 61 that is bonded to a side of the ribbon cable 51, such as by means of adhesives or known high frequency bonding techniques, longitudinally inwardly of the terminating end portion 510 of the ribbon cable 51. The restraining strip 61 extends transversely to the ribbon cable 51 and has opposite insert ends 610 that respectively project from opposite longitudinal edges of the ribbon cable 51. The retaining unit 7 representatively includes a pair of engaging grooves 71 respectively disposed adjacent the opposite longitudinal edges of the ribbon cable 51.

Figure 5:
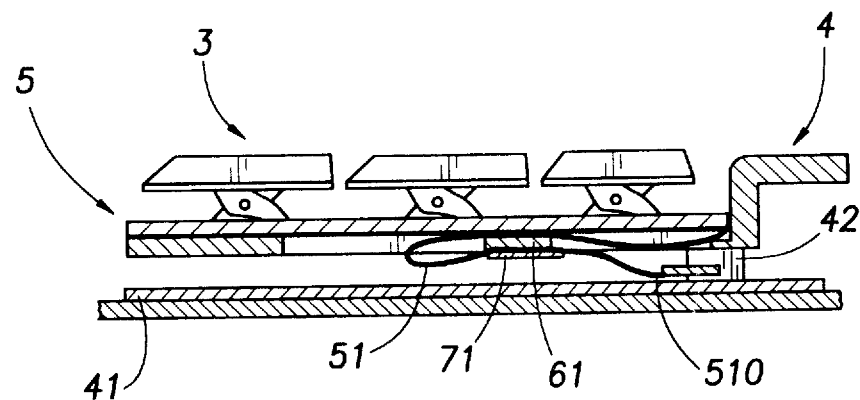
FIG. 5 is a schematic sectional view of a preferred embodiment which illustrates how the keyboard is mounted on the computer housing.

As shown in FIG. 4, when mounting the keyboard unit 5 on the housing 4, since the restraining strip 61 and the ribbon cable 51 are flexible, the restraining strip 61 can be flexed so that the opposite insert ends 610 of the restraining strip 61 can be removably inserted respectively into the engaging grooves 71. After the insert ends 610 have engaged the engaging grooves 71, the terminating end portion 510 of the ribbon cable 51 is removably inserted into the socket connector 42, thereby electrically connecting the keyboard unit 5 and the main board 41. Tabs 52 (see FIG. 3) on the keyboard unit 5 are then extended into notches 43 (see FIG. 2) in the housing 4 to detachably mount the keyboard unit 5 on the housing 4 in a conventional manner, as shown in FIG. 5.

Figure 6:
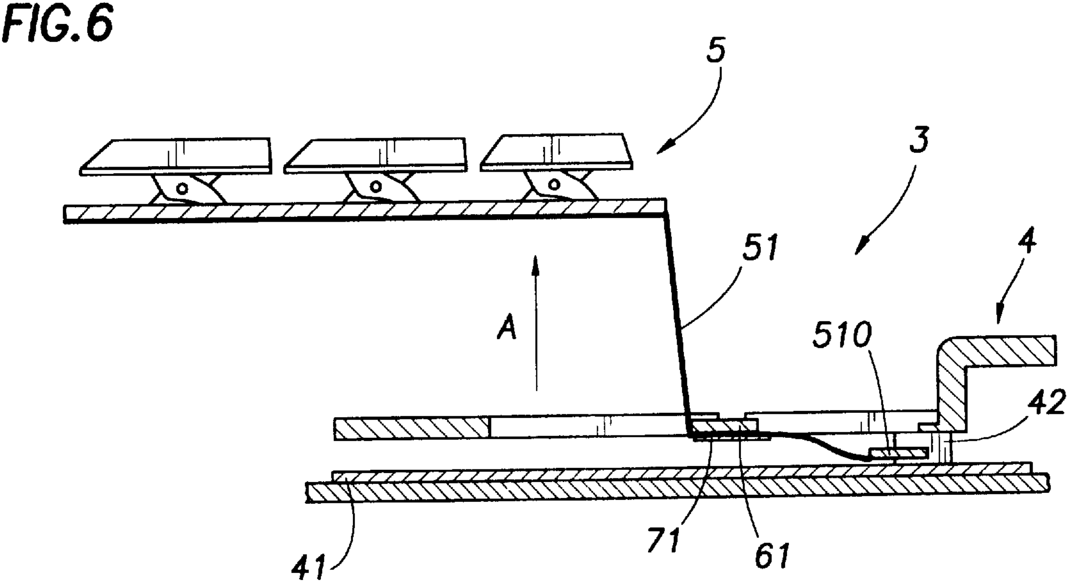
FIG. 6 is a schematic sectional view of a preferred embodiment which illustrates how the keyboard unit is detached from the computer housing.

Referring to FIG. 6, when the keyboard unit 5 is detached from the computer housing 4 for servicing or repair of the computer 3, a pulling force is applied to the ribbon cable 51, as indicated by the arrow (A). However, the pulling force is not transmitted to the terminating end portion 510 of the ribbon cable 51 and does not result in removal of the same from the socket connector 42 (at a potentially large angle relative to its original socket insertion direction) due to the engagement between the restraining strip 61 and the engaging grooves 71. As such, the terminating end portion 510 can be carefully removed from the socket connector 42 thereafter, in a direction essentially parallel to its original socket insertion direction, so as to minimize wearing or scraping of the printed circuit on the terminating end portion 510 of the ribbon cable 51, whenever the keyboard unit 5 is detached from the housing 4, to thereby prolong the service life of the keyboard unit 5. The cooperating units 6 and 7 on the cable and housing thus act as protective structure operative to prevent the initial cable force A, created during an initial phase of keyboard unit removal, from undesirably being transmitted to and potentially disconnecting and damaging the ribbon cable end portion 510.

The foregoing detailed description is to be clearly understood as being given by way of illustration and example only, the spirit and scope of the present invention being limited solely by the appended claims.

What is claimed is:

1. Electronic apparatus comprising:

electrical circuitry;

a component having a flexible connector with an outer portion removably connectable to said electrical circuitry, and an intermediate portion disposed between said component and said outer portion of said flexible connector; and protective structure operative to maintain a constant positional relationship between said intermediate portion and the electrical circuitry in a manner preventing a force exerted on said component, and moving it relative to said electrical circuitry, from being transmitted to said outer portion of said flexible connector and disconnecting it from said electrical circuitry.

2. The electronic apparatus of claim 1 wherein said electronic apparatus is a computer.

3. The electronic apparatus of claim 1 wherein said component is a keyboard.

4. The electronic apparatus of claim 1 wherein said electrical circuitry is disposed on a circuit board.

5. The electronic apparatus of claim 1 wherein said flexible connector is a ribbon cable.

6. Electronic apparatus comprising:

a support structure;

electrical circuitry carried by said support structure;

a component detachably securable to said support structure and having a flexible connector with an outer portion removably connectable to said electrical circuitry to electrically couple said component thereto, and an intermediate portion disposed between said outer portion of said flexible connector and said component; and cooperatively engageable structures on said intermediate portion of said flexible connector and said support structure for anchoring said intermediate portion of said flexible connector to said support structure, in a manner maintaining a constant positional relationship between said electrical circuitry and said intermediate portion of said flexible connector to thereby prevent a detachment force exerted on said component from being transmitted to said outer portion of said flexible connector and disconnecting it from said electrical circuitry.

7. The electronic apparatus of claim 6 wherein:

said support structure is a housing;

said electrical circuitry is disposed on a circuit board, and said component is a keyboard.

8. The electronic apparatus of claim 7 wherein said electronic apparatus is a computer.

9. The electronic apparatus of claim 6 wherein:

said cooperatively engageable structures include a restraining member secured to said intermediate portion of said flexible connector, and a retaining portion of said support structure to which said restraining member may be releasably connected.

10. The electronic apparatus of claim 9 wherein:

said flexible connector is a ribbon cable.

11. The electronic apparatus of claim 10 wherein:

said restraining member is a restraining strip member transversely secured to a longitudinally intermediate portion of said ribbon cable and having opposite end portions extending outwardly past opposite longitudinally extending edges of said ribbon cable, and said retaining portion of said support structure includes a pair of grooves formed in said support structures and adapted to releasably receive said opposite end portions of said restraining strip member.

12. The electronic apparatus of claim 11 wherein:

said restraining member is formed from a semi-rigid material.

13. Electronic apparatus comprising:

a component having a flexible connector extending outwardly therefrom and having an outer portion releasably connectable to electrical circuitry to electrically couple said component thereto; and a restraining member secured to said flexible connector between said outer portion thereof and said component and being anchorable in a fixed position relative to the electrical circuitry, in a manner maintaining a constant positional relationship between said electrical circuitry and said restraining member, to thereby prevent a force exerted on said component, and moving it relative to the electrical circuitry, from being transmitted to said outer portion of said flexible connector and disconnecting it from the electrical circuitry.

14. The electronic apparatus of claim 13 wherein:

said component is a keyboard.

15. The electronic apparatus of claim 14 wherein:

said component is a computer keyboard.

16. The electronic apparatus of claim 13 wherein:

said flexible connector is a ribbon cable.

17. The electronic apparatus of claim 16 wherein:

said restraining member is a restraining strip member transversely secured to a longitudinally intermediate portion of said ribbon cable and having opposite end portions extending outwardly past opposite longitudinally extending edges of said ribbon cable.

18. The electronic apparatus of claim 17 wherein said restraining strip is formed from a semi-rigid material.

19. A computer comprising:

a housing having a main board provided therein, said main board having a sock e t connector mounted thereon; and a keyboard unit detachably mounted on said housing and provided with a ribbon cable which extends into said housing and which has a terminating end that is removably inserted into said socket connector, said ribbon cable being provided with a re straining strip that is secured to said ribbon cable longitudinally inwardly of said terminating end and extends transversely to said ribbon cable, said housing being formed with groove means for removably engaging said restraining strip to prevent sudden removal of said terminating end of said ribbon cable from said socket connector when said keyboard unit is detached from said housing.

20. The computer of claim 19 wherein:

said restraining strip has opposite insert ends that project respectively from opposite longitudinal edges of said ribbon cable, said groove means include a pair of engaging grooves respectively disposed adjacent said opposite longitudinal edges of said ribbon cable, and said opposite insert ends of said restraining strip are removably received in said engaging grooves.

21. A method of constructing an electronic device comprising the steps of:

providing a housing having electronic circuitry therein;

detachably connecting a component to said housing;

electrically coupling said component to said electronic circuitry with a flexible connector having a first portion secured to said component, a second portion spaced apart from said first portion and removably connected to said electronic circuitry, and an intermediate portion disposed between said first and second portions; and maintaining a constant positional relationship between said electronic circuitry and said intermediate portion of said flexible connector in a manner preventing any movement of said first portion from causing movement of said second portion relative to said electronic circuitry, to thereby prevent a detachment force exerted on said component from being transmitted to said second portion via said intermediate portion of said flexible connector.

22. The method of claim 21 wherein:

the electronic device is a computer, and said detachably connecting step is performed by detachably connecting a keyboard to said housing.

23. The method of claim 22 wherein:

said flexible connector is a ribbon cable, and said fixing step is performed by securing a longitudinally intermediate portion of said ribbon cable to said housing.

* * * * *